US011651725B2

(12) United States Patent
Zhao et al.

(10) Patent No.: US 11,651,725 B2
(45) Date of Patent: May 16, 2023

(54) FINGERPRINT IDENTIFICATION PIXEL DRIVING CIRCUIT AND METHOD FOR DRIVING THE SAME, DISPLAY PANEL

(71) Applicant: BOE Technology Group Co., Ltd., Beijing (CN)

(72) Inventors: Lijun Zhao, Beijing (CN); Yingming Liu, Beijing (CN); Haisheng Wang, Beijing (CN); Yanling Han, Beijing (CN); Yuzhen Guo, Beijing (CN); Chenyang Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 438 days.

(21) Appl. No.: 17/043,318

(22) PCT Filed: Apr. 22, 2020

(86) PCT No.: PCT/CN2020/086048
§ 371 (c)(1),
(2) Date: Sep. 29, 2020

(87) PCT Pub. No.: WO2020/233321
PCT Pub. Date: Nov. 26, 2020

(65) Prior Publication Data
US 2023/0101504 A1 Mar. 30, 2023

(30) Foreign Application Priority Data
May 17, 2019 (CN) .......................... 201910412183.0

(51) Int. Cl.
*G09G 3/32* (2016.01)
*G06V 40/13* (2022.01)

(52) U.S. Cl.
CPC ........... *G09G 3/32* (2013.01); *G06V 40/1306* (2022.01); *G09G 2300/0426* (2013.01);
(Continued)

(58) Field of Classification Search
CPC ............. G09G 3/32; G09G 2300/0426; G09G 2300/0842; G09G 2310/0262; G09G 2310/08; G06V 40/1306
See application file for complete search history.

(56) References Cited

U.S. PATENT DOCUMENTS 11,055,510 B1 * 7/2021 Cheng .................. H04N 25/617
11,093,090 B2 * 8/2021 Larsson ............. G06F 3/04166
(Continued)

FOREIGN PATENT DOCUMENTS

CN 104282265 A 1/2015
CN 107134259 A 9/2017
(Continued)

OTHER PUBLICATIONS

First Office Action dated Sep. 29, 2020 for application No. CN201910412183.0 with English translation attached.

*Primary Examiner* — Doon Y Chow
(74) *Attorney, Agent, or Firm* — Nath, Goldberg & Meyer; Joshua B. Goldberg (57) ABSTRACT

There is provided a fingerprint identification pixel driving circuit, including: a fingerprint signal identification element configured to transmit an ultrasonic wave and receive a reflected ultrasonic wave according to a voltage of a first node and a signal of a second signal terminal to generate a sensing signal; a drive reading element configured to drive a light emitting element according to the voltage of the first node and generate a sensing current according to the sensing signal; a fingerprint signal reading element configured to output the sensing current; a pixel charging element configured to write a signal of a data line terminal to a storage element; the storage element configured to store the sensing signal or the signal of the data line terminal; a light emitting control element configured to control light emitting of the
(Continued)

light emitting element; and the light emitting element configured to emit light.

15 Claims, 4 Drawing Sheets

(52) U.S. Cl.
CPC .............. *G09G 2300/0842* (2013.01); *G09G 2310/0262* (2013.01); *G09G 2310/08* (2013.01)

(56) References Cited

U.S. PATENT DOCUMENTS

| | | | |
|---|---|---|---|
| 11,144,742 B2* | 10/2021 | Zhang | G06F 3/04166 |
| 2014/0354597 A1 | 12/2014 | Kitchens, II et al. | |
| 2016/0132176 A1 | 5/2016 | Bae et al. | |
| 2017/0006245 A1 | 1/2017 | Akhavan Fomani et al. | |
| 2019/0087628 A1 | 3/2019 | Choe et al. | |
| 2019/0095669 A1 | 3/2019 | Jung et al. | |
| 2020/0348818 A1* | 11/2020 | Ding | G06F 3/04164 |

FOREIGN PATENT DOCUMENTS

| | | |
|---|---|---|
| CN | 107180611 A | 9/2017 |
| CN | 108154844 A | 6/2018 |
| CN | 108682386 A | 10/2018 |
| CN | 108806587 A | 11/2018 |
| CN | 109164942 A | 1/2019 |
| CN | 109872683 A | 6/2019 |
| CN | 110008939 A | 7/2019 |
| TW | 201721614 A | 6/2017 |

\* cited by examiner

FINGERPRINT IDENTIFICATION PIXEL DRIVING CIRCUIT AND METHOD FOR DRIVING THE SAME, DISPLAY PANEL

CROSS REFERENCE TO RELATED APPLICATION

This is a National Phase Application filed under 35 U.S.C. 371 as a national stage of PCT/CN2020/086048, filed Apr. 22, 2020, an application claiming the benefit of Chinese patent application No. 201910412183.0 filed on May 17, 2019, the contents of each of which are incorporated herein by reference in their entirety.

TECHNICAL FIELD

The present disclosure belongs to the technical field of display, and particularly relates to a fingerprint identification pixel driving circuit and a method for driving the same, a display panel.

BACKGROUND

In a display panel having a fingerprint identification function, a fingerprint identification circuit and a pixel driving circuit are generally two circuits separately provided. Since a plurality of fingerprint identification circuits and a plurality of pixel driving circuits are arranged in one display panel, the fingerprint identification circuits and the pixel driving circuits being separately arranged not only occupy a lot of space in the display panel so that the display panel is relatively larger in volume, but also result in a complex process for manufacturing the display panel and a relatively high cost.

SUMMARY

An embodiment of the present disclosure provides a fingerprint identification pixel driving circuit, including: a fingerprint signal identification element, a drive reading element, a fingerprint signal reading element, a pixel charging element, a storage element, a light emitting control element and a light emitting element;

the fingerprint signal identification element is configured to adjust a voltage of a first node according to a signal of a first signal terminal, and generate a sensing signal by transmitting an ultrasonic wave and receiving a reflected ultrasonic wave according to the voltage of the first node and a signal of a second signal terminal;

the drive reading element is configured to drive the light emitting element to emit light according to the voltage of the first node and generate a sensing current according to the sensing signal;

the fingerprint signal reading element is configured to output the sensing current to a fingerprint reading terminal through the drive reading element;

the pixel charging element is configured to write a signal of a data line terminal to the storage element through the drive reading element;

a first terminal of the storage element is coupled to a first voltage terminal, a second terminal of the storage element is coupled to the first node, and the storage element is configured to store the sensing signal or the signal of the data line terminal;

the light emitting control element is configured to control light emitting of the light emitting element.

In some implementations, the fingerprint signal identification element includes: a first transistor, where a gate electrode of the first transistor is coupled to a third signal terminal, a first electrode of the first transistor is coupled to the first node, and a second electrode of the first transistor is coupled to the first signal terminal; a piezoelectric layer, where a terminal of the piezoelectric layer is coupled to the first node, and another terminal of the piezoelectric layer is coupled to the second signal terminal.

In some implementations, the drive reading element includes: a second transistor, where a gate electrode of the second transistor is coupled to the first node, a first electrode of the second transistor is to a third node, and a second electrode of the second transistor is coupled to a second node.

In some implementations, the fingerprint signal reading element includes: a third transistor, where a gate electrode of the third transistor is coupled to a fourth signal terminal, a first electrode of the third transistor is coupled to the third node, and a second electrode of the third transistor is coupled to the first voltage terminal; a fourth transistor, where a gate electrode of the fourth transistor is coupled to a fifth signal terminal, a first electrode of the fourth transistor is coupled to the fingerprint reading terminal, and a second electrode of the fourth transistor is coupled to the second node.

In some implementations, the pixel charging element includes: a fifth transistor, where a gate electrode of the fifth transistor is coupled to a gate line terminal, a first electrode of the fifth transistor is coupled to the data line terminal, and a second electrode of the fifth transistor is coupled to the third node; and a sixth transistor, where a gate electrode of the sixth transistor is coupled to the gate line terminal, a first electrode of the sixth transistor is coupled to the second node, and a second electrode of the sixth transistor is coupled to the first node.

In some implementations, the storage element includes: a storage capacitor, where a first electrode of the storage capacitor is coupled to the first voltage terminal, and a second electrode of the storage capacitor is coupled to the first node.

In some implementations, the light emitting control element includes: a seventh transistor, where a gate electrode of the seventh transistor is coupled to a sixth signal terminal, a first electrode of the seventh transistor is coupled to the second node, and a second electrode of the seventh transistor is coupled to the light emitting element.

An embodiment of the present further provides a fingerprint identification pixel driving circuit, including a first transistor, a second transistor, a third transistor, a fourth transistor, a fifth transistor, a sixth transistor, a seventh transistor, a piezoelectric layer, a storage capacitor and a light emitting diode, a gate electrode of the first transistor is coupled to a third signal terminal, a first electrode of the first transistor is coupled to a first node, a second electrode of the first transistor is coupled to a first signal terminal, a gate electrode of the second transistor is coupled to the first node, a first electrode of the second transistor is coupled to a third node, a second electrode of the second transistor is coupled to a second node, a gate electrode of the third transistor is coupled to a fourth signal terminal, a first electrode of the third transistor is coupled to the third node, a second electrode of the third transistor is coupled to a first voltage terminal, a gate electrode of the fourth transistor is coupled to a fifth signal terminal, a first electrode of the fourth transistor is coupled to a fingerprint reading terminal, a second electrode of the fourth transistor is coupled to the second node, a gate electrode of the fifth transistor is coupled to a gate line terminal, a first electrode of the fifth transistor is coupled to a data line terminal, a second electrode of the fifth transistor is coupled to the third node, a gate electrode of the sixth transistor is coupled to the gate line terminal, a first electrode of the sixth transistor is coupled to the second node, a second electrode of the sixth transistor is coupled to the first node, a gate electrode of the seventh transistor is coupled to a sixth signal terminal, a first electrode of the seventh transistor is coupled to the second node, a second electrode of the seventh transistor is coupled to an anode of the light emitting diode, a terminal of the piezoelectric layer is coupled to the first node, another terminal of the piezoelectric layer is coupled to a second signal terminal, a first electrode of the storage capacitor is coupled to the first voltage terminal, a second electrode of the storage capacitor is coupled to the first node, a cathode of the light emitting diode is coupled to a second voltage terminal.

In some implementations, the first transistor, the second transistor, the third transistor, the fourth transistor, the fifth transistor, the sixth transistor, and the seventh transistor are all P-type transistors.

An embodiment of the present disclosure further provides a method for driving the fingerprint identification pixel driving circuit described above, the method includes:

in an ultrasonic wave transmitting stage, the fingerprint signal identification element transmits an ultrasonic wave according to a voltage of the first node and a signal of the second signal terminal;

in an ultrasonic wave receiving stage, the fingerprint signal identification element receives a reflected ultrasonic wave according to the voltage of the first node and the signal of the second signal terminal to generate a sensing signal;

in a fingerprint signal reading stage, the drive reading element generates a sensing current according to the sensing signal, and the fingerprint signal reading element outputs the sensing current to the fingerprint reading terminal through the drive reading element;

in a reset stage, the fingerprint signal identification element adjusts the voltage of the first node according to a signal of the first signal terminal;

in a pixel charging stage, the pixel charging element writes a signal of the data line terminal to the storage element through the drive reading element; and in a light emitting stage, the drive reading element drives the light emitting element to emit light according to the voltage of the first node, and the light emitting control element is configured to control the light emitting element to emit light.

In some implementations, the method includes:

in the ultrasonic wave transmitting stage, inputting an ultrasonic wave transmitting signal to the first signal terminal and the second signal terminal, inputting a turn-on signal to the third signal terminal, and inputting a turn-off signal to the gate line terminal, the fourth signal terminal, the fifth signal terminal and the sixth signal terminal;

in the ultrasonic receiving stage, inputting a same signal to the first signal terminal and the third signal terminal, inputting an ultrasonic receiving signal to the second signal terminal, and inputting the turn-off signal to the gate line terminal, the fourth signal terminal, the fifth signal terminal and the sixth signal terminal;

in the fingerprint signal reading stage, inputting the turn-on signal to the fourth signal terminal, inputting the turn-on signal to the fifth signal terminal, and inputting the turn-off signal to the gate line terminal, the third signal terminal and the sixth signal terminal;

in the reset stage, inputting a reset signal to the first signal terminal, inputting a turn-on signal to the third signal terminal, and inputting a turn-off signal to the gate line terminal, the fourth signal terminal, the fifth signal terminal and the sixth signal terminal;

in the pixel charging stage, inputting the turn-on signal to the gate line terminal, and inputting the turn-off signal to the third signal terminal, the fourth signal terminal, the fifth signal terminal and the sixth signal terminal; and in the light emitting stage, inputting the turn-on signal to the sixth signal terminal, and inputting the turn-off signal to the gate line terminal, the third signal terminal and the fifth signal terminal.

An embodiment of the present disclosure further provides a display panel, including a plurality of fingerprint identification pixel driving circuits, and at least one of the fingerprint identification pixel driving circuits is the fingerprint identification pixel driving circuit described above.

DESCRIPTION OF EMBODIMENTS

In order that those skilled in the art will better understand the technical solutions of the present disclosure, the following detailed description is given with reference to the accompanying drawings and the specific embodiments.

Figure 1:
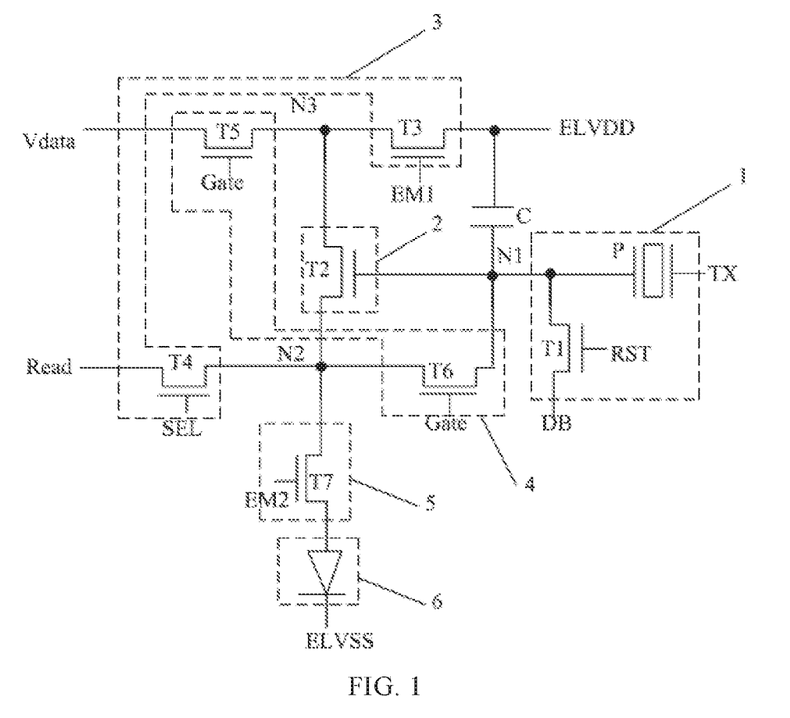
FIG. 1 is a schematic structural diagram of a fingerprint identification pixel driving circuit according to an embodiment of the present disclosure.
Figure 2:
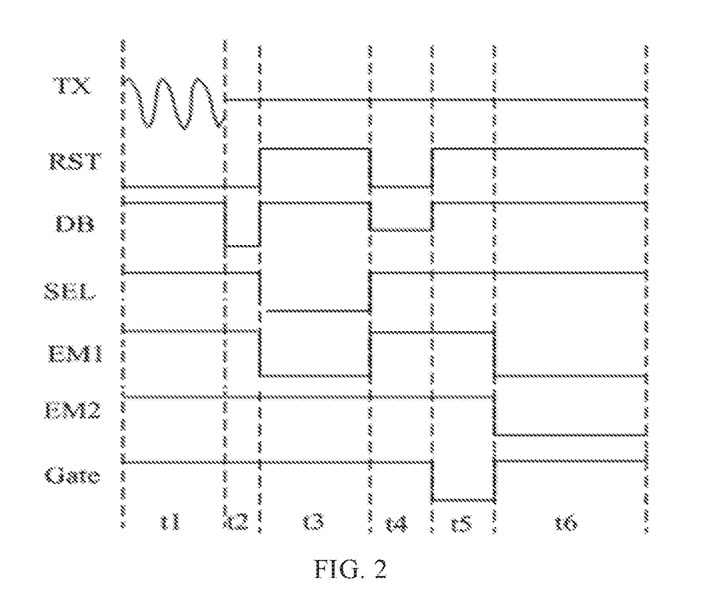
FIG. 2 is a timing diagram illustrating an operation of the fingerprint identification pixel driving circuit shown in FIG. 1.

As shown in FIGS. 1 to 3, an embodiment of the present disclosure provides a fingerprint identification pixel driving circuit, including: a fingerprint signal identification element 1, a drive reading element 2, a fingerprint signal reading element 3, a pixel charging element 4, a storage element, a light emitting control element 5, and a light emitting element 6.

The fingerprint signal identification element 1 is configured to adjust a voltage of a first node N1 according to a signal of a first signal terminal DB, and generate a sensing signal by transmitting an ultrasonic wave and receiving a reflected ultrasonic wave according to the voltage of the first node N1, a signal of a second signal terminal TX.

The drive reading element 2 is configured to drive the light emitting element 6 to emit light according to the voltage of the first node N1 and generate a sensing current according to the sensing signal.

The fingerprint signal reading element 3 is configured to output the sensing current to a fingerprint reading terminal Read through the drive reading element 2.

The pixel charging element 4 is configured to write a signal of a data line terminal Vdata to the storage element through the drive reading element 2.

The storage element has a first terminal coupled to a first voltage terminal ELVDD, and a second terminal coupled to the first node N1, and is configured to store the sensing signal or the signal of data line terminal Vdata.

The light emitting control element 5 is configured to control light emitting of the light emitting element 6.

The fingerprint identification pixel driving circuit of the present embodiment integrates a fingerprint identification circuit and a pixel driving circuit, and thus, compared with a display panel with the fingerprint identification circuit and the pixel driving circuit which are separately arranged, the display panel with the fingerprint identification pixel driving circuit has advantages of capable of being manufactured by a simple process, low cost and the like.

In some implementations, the fingerprint signal identification element 1 may include:

a first transistor T1 having a gate electrode coupled to a third signal terminal RST, a first electrode coupled to the first node N1, and a second electrode coupled to the first signal terminal DB;

a piezoelectric layer P having a terminal coupled to the first node N1, and another terminal coupled to the second signal terminal TX.

In some implementations, the drive reading element 2 may include:

a second transistor T2 having a gate electrode coupled to the first node N1, a first electrode coupled to a third node N3, and a second electrode coupled to a second node N2.

In some implementations, the fingerprint signal reading element 3 may include:

a third transistor T3 having a gate electrode coupled to a fourth signal terminal EM1, a first electrode coupled to the third node N3, and a second electrode coupled to the first voltage terminal ELVDD;

a fourth transistor T4 having a gate electrode coupled to a fifth signal terminal SEL, a first electrode coupled to the fingerprint reading terminal Read, and a second electrode coupled to the second node N2.

In some implementations, the pixel charging element 4 may include:

a fifth transistor T5 having a gate electrode coupled to a gate line terminal Gate, a first electrode coupled to the data line terminal Vdata, and a second electrode coupled to the third node N3;

a sixth transistor T6 having a gate electrode coupled to the gate line terminal Gate, a first electrode coupled to the second node N2, and a second electrode coupled to the first node N1.

In some implementations, the storage element may include:

a storage capacitor C having a first electrode coupled to the first voltage terminal ELVDD and a second electrode coupled to the first node N1.

In some implementations, the light emitting control element 5 may include:

a seventh transistor T7 having a gate electrode coupled to a sixth signal terminal EM2, a first electrode coupled to the second node N2, and a second electrode coupled to the light emitting element 6.

It should be noted that the light Emitting element 6 in the present embodiment may include a current-driven light emitting device such as an LED (Light Emitting Diode) or an OLED (Organic Light Emitting Diode).

In some implementations, the light emitting element 6 may include a light emitting diode, an anode of which may be coupled to the second electrode of the seventh transistor T7, and a cathode of which may be coupled to a second voltage terminal ELVSS.

In some implementations, all transistors in the fingerprint identification pixel driving circuit of the present embodiment are N-type transistors.

Alternatively, all transistors in the fingerprint identification pixel driving circuit of the present embodiment may also be P-type transistors.

It should be understood that the first electrode and the second electrode of each of the transistors in the fingerprint identification pixel driving circuit of the present embodiment may be interchanged.

In the present embodiment, the first voltage terminal ELVDD is used to provide an operating voltage, and the second voltage terminal ELVSS is used to provide a reference voltage.

An embodiment of the present disclosure further provides a method for driving the fingerprint identification pixel driving circuit described above, and the method includes:

in an ultrasonic wave transmitting stage t1, the fingerprint signal identification element 1 transmits an ultrasonic wave according to a voltage of the first node N1 and a signal of the second signal terminal TX;

in an ultrasonic wave receiving stage t2, the fingerprint signal identification element 1 generates a sensing signal by receiving a reflected ultrasonic wave according to the voltage of the first node N1 and a signal of the second signal terminal TX;

in a fingerprint signal reading stage t3, the drive reading element 2 generates a sensing current according to the sensing signal, and the fingerprint signal reading element 3 outputs the sensing current to the fingerprint reading terminal Read through the drive reading element 2;

in a reset stage t4, the fingerprint signal identification element 1 adjusts the voltage of the first node N1 according to a signal of the first signal terminal DB;

in a pixel charging stage t5, the pixel charging element 4 writes a signal of the data line terminal Vdata to the storage element through the drive reading element 2;

in a light emitting stage t6, the drive reading element 2 drives the light emitting element 6 to emit light according to the voltage of the first node N1, and the light emitting control element 5 is configured to control light emitting of the light emitting element 6.

In the driving method of the present embodiment, the first voltage terminal ELVDD provides the operating voltage, and the second voltage terminal ELVSS provides the reference voltage.

In some implementations, the driving method specifically includes the following steps S11 to S16.

Figure 3A:
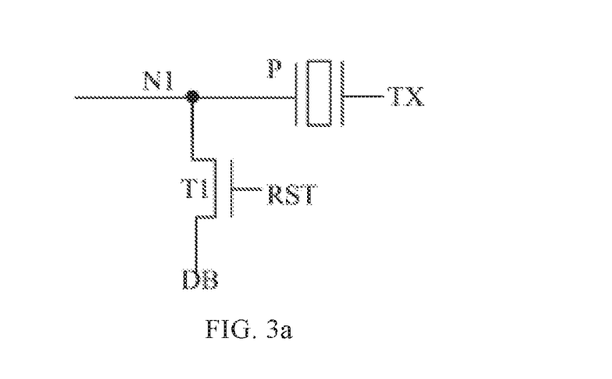
FIG. 3a is a diagram of equivalent circuit of a fingerprint identification pixel driving circuit in an ultrasonic wave transmitting stage according to an embodiment of the present disclosure.

At step S11, in the ultrasonic wave transmitting stage t1, an ultrasonic wave transmitting signal is input to the first signal terminal DB and the second signal terminal TX, a turn-on signal is input to the third signal terminal RST, and a turn-off signal is input to the gate line terminal Gate, the fourth signal terminal EM1, the fifth signal terminal SEL, and the sixth signal terminal EM2.

The turn-on signal refers to a signal that can turn on a transistor when being applied to a gate electrode of the transistor, the turn-off signal refers to a signal that can turn off the transistor when being applied to the gate electrode of the transistor, and the ultrasonic wave transmitting signal refers to a signal that can cause the piezoelectric layer P to transmit an ultrasonic wave.

It should be noted that, in the following description, all transistors are P-type transistors, and therefore, the turn-on signal is a low level signal, and the turn-off signal is a high level signal.

That is, as shown in FIGS. 1, 2 and 3*a*, in this stage, a high level signal is input to the gate line terminal Gate, the fourth signal terminal EM1, the fifth signal terminal SEL, and the sixth signal terminal EM2, so that the third transistor T3, the fourth transistor T4, the fifth transistor T5, the sixth transistor T6, and the seventh transistor T7 are turned off. A low level signal is input to the third signal terminal RST to turn on the first transistor T1, the ultrasonic wave transmitting signal input to the first signal terminal DB may be a high level signal, and thus the high level signal of the first signal terminal DB is written to the first node N1. Specifically, the ultrasonic wave transmitting signal input to the second signal terminal TX may be an oscillating high-frequency voltage. The high level signal passing through the first node N1 and the high-frequency voltage of the second signal terminal TX may cause the piezoelectric layer P to convert an electrical signal into an ultrasonic wave and transmit the converted ultrasonic wave.

Figure 3B:
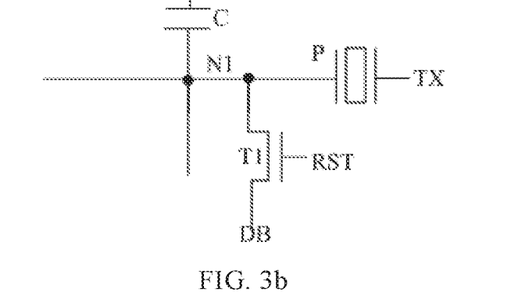
FIG. 3b is a diagram of equivalent circuit of a fingerprint identification pixel driving circuit in an ultrasonic receiving stage according to an embodiment of the present disclosure.

At step S12, in the ultrasonic wave receiving stage t2, a same signal (for example, a low level signal) is input to the first signal terminal DB and the third signal terminal RST, an ultrasonic wave receiving signal is input to the second signal terminal TX, and the turn-off signal is input to the gate line terminal Gate, the fourth signal terminal EM1, the fifth signal terminal SEL, and the sixth signal terminal EM 2.

That is, as shown in FIGS. 1, 2 and 3*b*, in this stage, a high level signal is input to the gate line terminal Gate, the fourth signal terminal EM1, the fifth signal terminal SEL, and the sixth signal terminal EM2, so that the third transistor T3, the fourth transistor T4, the fifth transistor T5, the sixth transistor T6, and the seventh transistor T7 are turned off. By inputting the same signal to the first signal terminal DB and the third signal terminal RST, the first transistor T1 functions as a diode, i.e., the signal of the first signal terminal DB can only be written to the first node N1 through the first transistor T1, but the voltage of the first node N1 cannot be transmitted to the first signal terminal DB. The ultrasonic wave receiving signal of the second signal terminal TX is a low level signal, so that the signal of the second signal terminal TX is prevented from affecting the reflected ultrasonic wave being received by the piezoelectric layer P. In this stage, the ultrasonic wave received by the piezoelectric layer P is the ultrasonic wave transmitted by the piezoelectric layer P in the previous stage and reflected by an external object (such as a fingerprint). In this stage, the piezoelectric layer P converts the reflected ultrasonic wave into an electric signal, i.e., a sensing signal, and writes the sensing signal to the first node N1. At this time, the voltage of the first node N1 is a sum of the voltage of the signal at the first signal terminal DB and the voltage of the sensing signal, and is stored in the storage capacitor C.

Figure 3C:
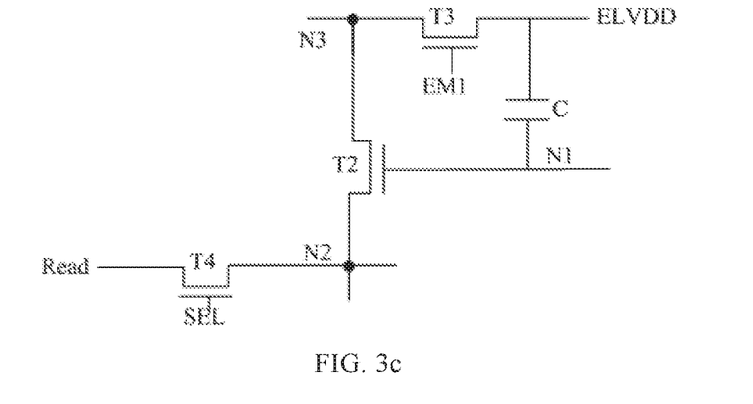
FIG. 3c is a diagram of equivalent circuit of a fingerprint identification pixel driving circuit in a fingerprint signal reading stage according to an embodiment of the present disclosure.

At step S13, in the fingerprint signal reading stage t3, the turn-on signal is input to the fourth signal terminal EM1, the turn-on signal is input to the fifth signal terminal SEL, and the turn-off signal is input to the gate line terminal Gate, the third signal terminal RST and the sixth signal terminal EM2.

That is, as shown in FIGS. 1, 2 and 3*c*, in this stage, a high level signal is input to the gate line terminal Gate, the third signal terminal RST and the sixth signal terminal EM2, so that the first transistor T1, the fifth transistor T5, the sixth transistor T6 and the seventh transistor T7 are turned off. A low level signal is input to the fourth signal terminal EM1 and the fifth signal terminal SEL, so that the third transistor T3 and the fourth transistor T4 are turned on. Since the sum of the voltage of the signal at the first signal terminal DB and the voltage of the sensing signal is stored in the storage capacitor C in the previous stage, the voltage of the first node N1 turns on the second transistor T2, so that the signal of the first voltage terminal ELVDD is transmitted to the fingerprint reading terminal Read, i.e., the current generated at the first voltage terminal ELVDD flows to the fingerprint reading terminal Read through the second transistor T2. Meanwhile, the second transistor T2 being turned on can control the current flowing to the fingerprint reading terminal Read according to the sensing signal generated by the piezoelectric layer P, so that the fingerprint reading terminal Read can read the sensing signal corresponding to the reflected ultrasonic wave, and finally a specific situation of the fingerprint is determined.

Figure 3D:
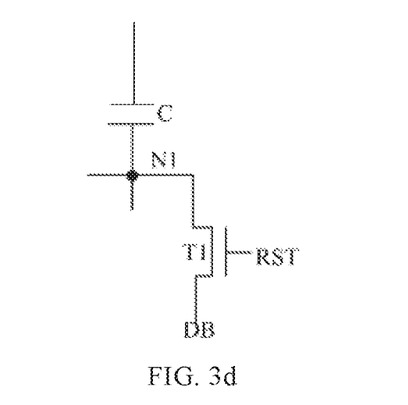
FIG. 3d is a diagram of equivalent circuit of a fingerprint identification pixel driving circuit in a reset stage according to an embodiment of the present disclosure.

At step S14, in the reset stage t4, a reset signal is input to the first signal terminal DB, the turn-on signal is input to the third signal terminal RST, and the turn-off signal is input to the gate line terminal Gate, the fourth signal terminal EM1, the fifth signal terminal SEL, and the sixth signal terminal EM2.

That is, as shown in FIGS. 1, 2 and 3*d*, in this stage, a high level signal is input to the gate line terminal Gate, the fourth signal terminal EM1, the fifth signal terminal SEL, and the sixth signal terminal EM2, so that the third transistor T3, the fourth transistor T4, the fifth transistor T5, the sixth transistor T6, and the seventh transistor T7 are turned off. A low level signal is input to the third signal terminal RST, the first transistor T1 is turned on, so that the reset signal of the first signal terminal DB is written to the first node N1 and stored in the storage capacitor C.

It should be noted that, since the step of driving the light emitting element 6 to emit light is started from this stage, in order that the second signal terminal TX does not adversely affect this stage and the following stages, a low level signal is input to the second signal terminal TX in the present stage and the following stages.

Figure 3E:
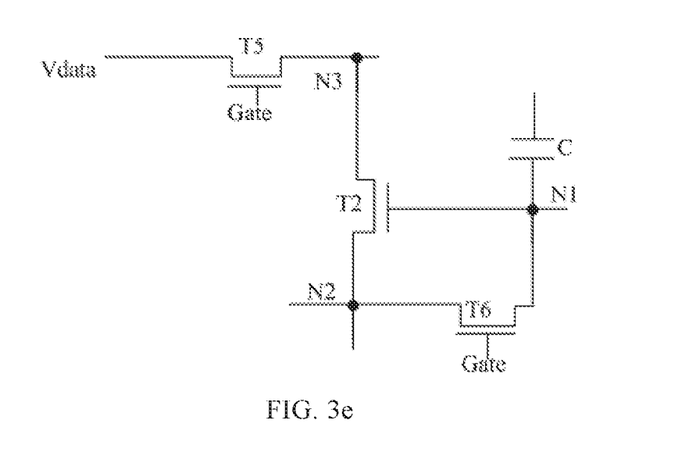
FIG. 3e is a diagram of equivalent circuit of a fingerprint identification pixel driving circuit in a pixel charging stage according to an embodiment of the present disclosure.

At step S15, in the pixel charging stage t5, the gate line terminal Gate is provided with the turn-on signal, and the turn-off signal is input to the third signal terminal RST, the fourth signal terminal EM1, the fifth signal terminal SEL, and the sixth signal terminal EM2.

That is, as shown in FIGS. 1, 2 and 3*e*, in this stage, a high level signal is input to the third signal terminal RST, the fourth signal terminal EM1, the fifth signal terminal SEL, and the sixth signal terminal EM2, so that the first transistor T1, the third transistor T3, the fourth transistor T4, and the seventh transistor T7 are turned off. The gate line terminal Gate is provided with a low level signal, so that the fifth transistor T5 and the sixth transistor T6 are turned on. Meanwhile, the second transistor T2 is turned on by the reset signal stored in the storage capacitor C in the previous stage, and the signal of the data line terminal Vdata can be written to the storage capacitor C through the fifth transistor T5, the second transistor T2 and the sixth transistor T6 in sequence.

Figure 3F:
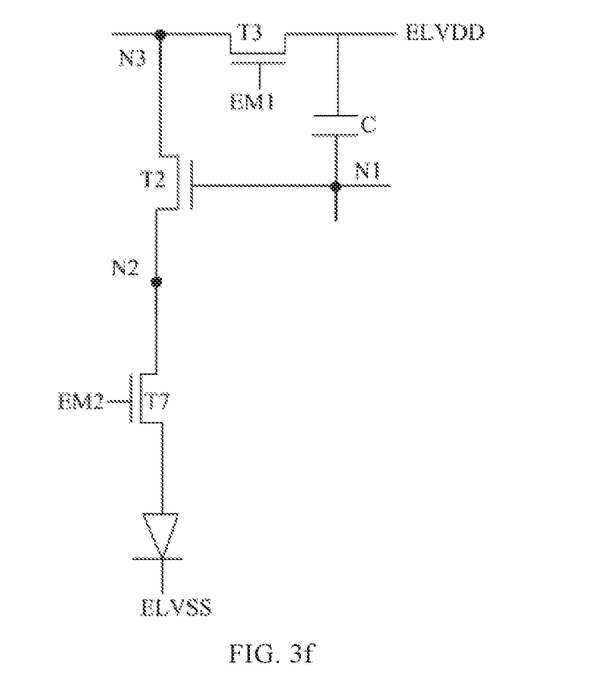
FIG. 3f is a diagram of equivalent circuit of a fingerprint identification pixel driving circuit in a light emitting stage according to the embodiment of the present disclosure.

At step S16, in the light emitting stage t6, the turn-on signal is provided to the fourth signal terminal EM1 and the sixth signal terminal EM2, and the turn-off signal is input to the gate line terminal Gate, the third signal terminal RST and the fifth signal terminal SEL.

That is, as shown in FIGS. 1, 2 and 3f, in this stage, a high level is input to the gate line terminal Gate, the third signal terminal RST and the fifth signal terminal SEL so that the first transistor T1, the fourth transistor T4, the fifth transistor T5 and the sixth transistor T6 are turned off. A low level signal is input to the fourth signal terminal EM1 and the sixth signal terminal EM2, so that the third transistor T3 and the seventh transistor T7 are turned on. Meanwhile, the second transistor T2 is turned on due to the storage capacitor C, and the current generated at the first voltage terminal ELVDD flows to the light emitting element 6 through the third transistor T3, the second transistor T2, and the seventh transistor T7. Meanwhile, the second transistor T2 being turned on may control a magnitude of current flowing to the light emitting element 6 according to the signal of the data line terminal Vdata, so as to control a light emitting condition of the light emitting element 6.

An embodiment of the present disclosure further provides a display panel, including a plurality of fingerprint identification pixel driving circuits, and each of the fingerprint identification pixel driving circuits may be the fingerprint identification pixel driving circuit described above.

Specifically, the display panel may be any product or component having a display function, such as an Organic Light Emitting Diode (OLED) display panel, an electronic paper, a mobile phone, a tablet computer, a television, a display, a notebook computer, a digital photo frame, and a navigator.

It should be noted that, in the present disclosure, relational terms such as first and second, and the like are used solely to distinguish one entity or action from another entity or action without necessarily requiring or implying any actual such relationship or order between such entities or actions. Also, the terms "include", "including" or any other variation thereof, are intended to cover a non-exclusive inclusion, such that a process, method, article, or apparatus that includes a list of elements does not include only those elements but may include other elements not expressly listed or inherent to such process, method, article, or apparatus. Without further limitation, an element identified by the phrase "including a/an . . . " does not exclude the presence of other identical elements in the process, method, article, or apparatus that includes a corresponding element.

In accordance with embodiments of the present disclosure, as described above, these embodiments are not exhaustive of all of details, nor are they intended to limit the present disclosure to these specific embodiments alone. Obviously, many modifications and variations are possible in light of the above teaching. The embodiments were chosen and described in order to best explain principles of the present disclosure and practical applications, to thereby enable others skilled in the art to better utilize the present disclosure and various embodiments with various modifications as are suited to the particular use contemplated. The present disclosure is to be limited only by a full scope of the claims and their equivalents.

The invention claimed is:

1. A fingerprint identification pixel driving circuit, comprising: a fingerprint signal identification element, a drive reading element, a fingerprint signal reading element, a pixel charging element, a storage element, a light emitting control element and a light emitting element, wherein the fingerprint signal identification element is configured to adjust a voltage of a first node according to a signal of a first signal terminal, and generate a sensing signal by transmitting an ultrasonic wave and receiving a reflected ultrasonic wave according to the voltage of the first node and a signal of a second signal terminal;

the drive reading element is configured to drive the light emitting element to emit light according to the voltage of the first node and generate a sensing current according to the sensing signal;

the fingerprint signal reading element is configured to output the sensing current to a fingerprint reading terminal through the drive reading element;

the pixel charging element is configured to write a signal of a data line terminal to the storage element through the drive reading element;

a first terminal of the storage element is coupled to a first voltage terminal, a second terminal of the storage element is coupled to the first node, and the storage element is configured to store the sensing signal or the signal of the data line terminal;

the light emitting control element is configured to control light emitting of the light emitting element.

2. The fingerprint identification pixel driving circuit of claim 1, wherein the fingerprint signal identification element comprises:

a first transistor, wherein a gate electrode of the first transistor is coupled to a third signal terminal, a first electrode of the first transistor is coupled to the first node, and a second electrode of the first transistor is coupled to the first signal terminal;

a piezoelectric layer, wherein a terminal of the piezoelectric layer is coupled to the first node, and another terminal of the piezoelectric layer is coupled to the second signal terminal.

3. The fingerprint identification pixel driving circuit of claim 2, wherein the drive reading element comprises:

a second transistor, wherein a gate electrode of the second transistor is coupled to the first node, a first electrode of the second transistor is coupled to a third node, and a second electrode of the second transistor is coupled to a second node.

4. The fingerprint identification pixel driving circuit of claim 3, wherein the fingerprint signal reading element comprises:

a third transistor, wherein a gate electrode of the third transistor is coupled to a fourth signal terminal, a first electrode of the third transistor is coupled to the third node, and a second electrode of the third transistor is coupled to a first voltage terminal;

a fourth transistor, wherein a gate electrode of the fourth transistor is coupled to a fifth signal terminal, a first electrode of the fourth transistor is coupled to the fingerprint reading terminal, and a second electrode of the fourth transistor is coupled to the second node.

5. The fingerprint identification pixel driving circuit of claim 4, wherein the pixel charging element comprises:

a fifth transistor, wherein a gate electrode of the fifth transistor is coupled to a gate line terminal, a first electrode of the fifth transistor is coupled to the data line terminal, and a second electrode of the fifth transistor is coupled to the third node;

a sixth transistor, wherein a gate electrode of the sixth transistor is coupled to the gate line terminal, a first electrode of the sixth transistor is coupled to the second node, and a second electrode of the sixth transistor is coupled to the first node.

6. The fingerprint identification pixel driving circuit of claim 5, wherein the storage element comprises:
a storage capacitor, wherein a first electrode of the storage capacitor is coupled to the first voltage terminal, and a second electrode of the storage capacitor is coupled to the first node.

7. The fingerprint identification pixel driving circuit of claim 6, wherein the light emitting control element comprises:
a seventh transistor, wherein a gate electrode of the seventh transistor is coupled to a sixth signal terminal, a first electrode of the seventh transistor is coupled to the second node, and a second electrode of the seventh transistor is coupled to the light emitting element.

8. The fingerprint identification pixel driving circuit of claim 7, wherein the first transistor, the second transistor, the third transistor, the fourth transistor, the fifth transistor, the sixth transistor, and the seventh transistor are all P-type transistors.

9. A fingerprint identification pixel driving circuit, comprising a first transistor, a second transistor, a third transistor, a fourth transistor, a fifth transistor, a sixth transistor, a seventh transistor, a piezoelectric layer, a storage capacitor and a light emitting diode,
a gate electrode of the first transistor is coupled to a third signal terminal, a first electrode of the first transistor is coupled to a first node, a second electrode of the first transistor is coupled to a first signal terminal,
a gate electrode of the second transistor is coupled to the first node, a first electrode of the second transistor is coupled to a third node, a second electrode of the second transistor is coupled to a second node,
a gate electrode of the third transistor is coupled to a fourth signal terminal, a first electrode of the third transistor is coupled to the third node, a second electrode of the third transistor is coupled to a first voltage terminal,
a gate electrode of the fourth transistor is coupled to a fifth signal terminal, a first electrode of the fourth transistor is coupled to a fingerprint reading terminal, a second electrode of the fourth transistor is coupled to the second node,
a gate electrode of the fifth transistor is coupled to a gate line terminal, a first electrode of the fifth transistor is coupled to a data line terminal, a second electrode of the fifth transistor is coupled to the third node,
a gate electrode of the sixth transistor is coupled to the gate line terminal, a first electrode of the sixth transistor is coupled to the second node, a second electrode of the sixth transistor is coupled to the first node,
a gate electrode of the seventh transistor is coupled to a sixth signal terminal, a first electrode of the seventh transistor is coupled to the second node, a second electrode of the seventh transistor is coupled to an anode of the light emitting diode,
a terminal of the piezoelectric layer is coupled to the first node, another terminal of the piezoelectric layer is coupled to a second signal terminal,
a first electrode of the storage capacitor is coupled to the first voltage terminal, a second electrode of the storage capacitor is coupled to the first node,
a cathode of the light emitting diode is coupled to a second voltage terminal.

10. The fingerprint identification pixel driving circuit of claim 9, wherein, the first transistor, the second transistor, the third transistor, the fourth transistor, the fifth transistor, the sixth transistor and the seventh transistor are all P-type transistors.

11. A method for driving a fingerprint identification pixel driving circuit which comprises a fingerprint signal identification element, a drive reading element, a fingerprint signal reading element, a pixel charging element, a storage element, a light emitting control element and a light emitting element, wherein the fingerprint signal identification element is configured to adjust a voltage of a first node according to a signal of a first signal terminal and to transmit an ultrasonic wave according to the voltage of the first node and a signal of a second signal terminal and to receive a reflected ultrasonic wave to generate a sensing signal, the drive reading element is configured to drive the light emitting element to emit light according to the voltage of the first node and to generate a sensing current according to the sensing signal, the fingerprint signal reading element is configured to output the sensing current to a fingerprint reading terminal through the drive reading element, and the pixel charging element is configured to write a signal of a data line terminal to the storage element through the drive reading element, a first terminal of the storage element is coupled to a first voltage terminal, a second terminal of the storage element is coupled to the first node, the storage element is configured to store the sensing signal or the signal of the data line terminal, the light emitting control element is configured to control light emitting of the light emitting element, and the method comprises:
in an ultrasonic wave transmitting stage, the fingerprint signal identification element transmits an ultrasonic wave according to the voltage of the first node and the signal of the second signal terminal;
in an ultrasonic wave receiving stage, the fingerprint signal identification element receives a reflected ultrasonic wave according to the voltage of the first node and the signal of the second signal terminal to generate a sensing signal;
in a fingerprint signal reading stage, the drive reading element generates a sensing current according to the sensing signal, and the fingerprint signal reading element outputs the sensing current to a fingerprint reading terminal through the drive reading element;
in a reset stage, the fingerprint signal identification element adjusts the voltage of the first node according to the signal of the first signal terminal;
in a pixel charging stage, the pixel charging element writes a signal of a data line terminal to the storage element through the drive reading element; and
in a light emitting stage, the drive reading element drives the light emitting element to emit light according to the voltage of the first node, and the light emitting control element is configured to control the light emitting element to emit light.

12. The method of claim 11, wherein the fingerprint signal identification element includes a first transistor and a piezoelectric layer, a gate electrode of the first transistor is coupled to a third signal terminal, a first electrode of the first transistor is coupled to the first node, a second electrode of the first transistor is coupled to the first signal terminal, a terminal of the piezoelectric layer is coupled to the first node, and another terminal of the piezoelectric layer is coupled to the second signal terminal,
the drive reading element comprises a second transistor, a gate electrode of the second transistor is coupled to the first node, a first electrode of the second transistor is coupled to a third node, a second electrode of the second transistor is coupled to a second node, the fingerprint signal reading element comprises a third transistor and a fourth transistor, wherein a gate electrode of the third transistor is coupled to a fourth signal terminal, a first electrode of the third transistor is coupled to the third node, a second electrode of the third transistor is coupled to a first voltage terminal, a gate electrode of the fourth transistor is coupled to a fifth signal terminal, a first electrode of the fourth transistor is coupled to a fingerprint reading terminal, a second electrode of the fourth transistor is coupled to the second node, the pixel charging element comprises a fifth transistor and a sixth transistor, a gate electrode of the fifth transistor is coupled to a gate line terminal, a first electrode of the fifth transistor is coupled to the data line terminal, a second electrode of the fifth transistor is coupled to the third node, a gate electrode of the sixth transistor is coupled to the gate line terminal, a first electrode of the sixth transistor is coupled to the second node, a second electrode of the sixth transistor is coupled to the first node, the storage element comprises a storage capacitor, a first electrode of the storage capacitor is coupled to the first voltage terminal, a second electrode of the storage capacitor is coupled to the first node, the light emitting control element comprises a seventh transistor, a gate electrode of the seventh transistor is coupled to a sixth signal terminal, a first electrode of the seventh transistor is coupled to the second node, a second electrode of the seventh transistor is coupled to the light emitting element, the method comprises:

in the ultrasonic wave transmitting stage, inputting an ultrasonic wave transmitting signal to the first signal terminal and the second signal terminal, inputting a turn-on signal to the third signal terminal, and inputting a turn-off signal to the gate line terminal, the fourth signal terminal, the fifth signal terminal and the sixth signal terminal;

in the ultrasonic receiving stage, inputting a same signal to the first signal terminal and the third signal terminal, inputting an ultrasonic receiving signal to the second signal terminal, and inputting the turn-off signal to the gate line terminal, the fourth signal terminal, the fifth signal terminal and the sixth signal terminal;

in the fingerprint signal reading stage, inputting the turn-on signal to the fourth signal terminal, inputting the turn-on signal to the fifth signal terminal, and inputting the turn-off signal to the gate line terminal, the third signal terminal and the sixth signal terminal;

in the reset stage, inputting a reset signal to the first signal terminal, inputting the turn-on signal to the third signal terminal, and inputting the turn-off signal to the gate line terminal, the fourth signal terminal, the fifth signal terminal and the sixth signal terminal;

in the pixel charging stage, inputting the turn-on signal to the gate line terminal, and inputting the turn-off signal to the third signal terminal, the fourth signal terminal, the fifth signal terminal and the sixth signal terminal; and in the light emitting stage, inputting the turn-on signal to the fourth signal terminal and the sixth signal terminal, and inputting the turn-off signal to the gate line terminal, the third signal terminal and the fifth signal terminal.

13. A method for driving the fingerprint identification pixel driving circuit of claim 9, the method comprises:

in an ultrasonic wave transmitting stage, inputting an ultrasonic wave transmitting signal to the first signal terminal and the second signal terminal, inputting a turn-on signal to the third signal terminal, and inputting a turn-off signal to the gate line terminal, the fourth signal terminal, the fifth signal terminal and the sixth signal terminal;

in an ultrasonic receiving stage, inputting a same signal to the first signal terminal and the third signal terminal, inputting an ultrasonic receiving signal to the second signal terminal, and inputting the turn-off signal to the gate line terminal, the fourth signal terminal, the fifth signal terminal and the sixth signal terminal;

in a fingerprint signal reading stage, inputting the turn-on signal to the fourth signal terminal, inputting the turn-on signal to the fifth signal terminal, and inputting the turn-off signal to the gate line terminal, the third signal terminal and the sixth signal terminal;

in a reset stage, inputting a reset signal to the first signal terminal, inputting the turn-on signal to the third signal terminal, and inputting the turn-off signal to the gate line terminal, the fourth signal terminal, the fifth signal terminal and the sixth signal terminal;

in a pixel charging stage, inputting the turn-on signal to the gate line terminal, and inputting the turn-off signal to the third signal terminal, the fourth signal terminal, the fifth signal terminal and the sixth signal terminal; and in a light emitting stage, inputting the turn-on signal to the fourth signal terminal and the sixth signal terminal, and inputting the turn-off signal to the gate line terminal, the third signal terminal and the fifth signal terminal.

14. A display panel, comprising a plurality of fingerprint identification pixel driving circuits, at least one of which is the fingerprint identification pixel driving circuit of claim 1.

15. A display panel, comprising a plurality of fingerprint identification pixel driving circuits, at least one of which is the fingerprint identification pixel driving circuit of claim 9.

* * * * *